(12) United States Patent
Zhang et al.

(10) Patent No.: US 11,954,599 B2
(45) Date of Patent: Apr. 9, 2024

(54) BI-DIRECTIONAL INTERACTION NETWORK (BINET)-BASED PERSON SEARCH METHOD, SYSTEM, AND APPARATUS

(71) Applicant: INSTITUTE OF AUTOMATION, CHINESE ACADEMY OF SCIENCES, Beijing (CN)

(72) Inventors: Zhaoxiang Zhang, Beijing (CN); Tieniu Tan, Beijing (CN); Chunfeng Song, Beijing (CN); Wenkai Dong, Beijing (CN)

(73) Assignee: INSTITUTE OF AUTOMATION, CHINESE ACADEMY OF SCIENCES, Beijing (CN)

(*) Notice: Subject to any disclaimer, the term of this patent is extended or adjusted under 35 U.S.C. 154(b) by 442 days.

(21) Appl. No.: 17/347,608

(22) Filed: Jun. 15, 2021

(65) Prior Publication Data

US 2021/0397828 A1 Dec. 23, 2021

Related U.S. Application Data (63) Continuation of application No. PCT/CN2020/099943, filed on Jul. 2, 2020.

(30) Foreign Application Priority Data

Jun. 18, 2020 (CN) .......................... 202010557984.9

(51) Int. Cl.
*G06V 40/10* (2022.01)
*G06F 18/21* (2023.01)
(Continued)

(52) U.S. Cl.
CPC ......... *G06N 3/084* (2013.01); *G06F 18/2148* (2023.01); *G06F 18/2193* (2023.01);
(Continued)

(58) Field of Classification Search
CPC ............ G06F 18/2148; G06F 18/2193; G06F 18/2415; G06V 20/40; G06V 40/103
See application file for complete search history.

(56) References Cited

U.S. PATENT DOCUMENTS

2017/0032676 A1 2/2017 Mesmakhosroshahi et al.
2022/0398730 A1* 12/2022 Neumann ............. G06T 7/0012

FOREIGN PATENT DOCUMENTS

CN 111209799 A 5/2020

OTHER PUBLICATIONS

Wenkai Dong, et al., Bi-directional Interaction Network for Person Search, 2020 IEEE—CVF Conference on Computer Vision and Pattern Recognition (CVPR), 2020, pp. 2839-2848.

* cited by examiner

*Primary Examiner* — Diane D Mizrahi
(74) *Attorney, Agent, or Firm* — Bayramoglu Law Offices LLC (57) ABSTRACT

A bi-directional interaction network (BINet)-based person search method, system, and apparatus are provided. The method includes: obtaining, as an input image, a $t^{th}$ frame of image in an input video; and normalizing the input image, and obtaining a search result of a to-be-searched target person by using a pre-trained person search model, where the person search model is constructed based on a residual network, and a new classification layer is added to a classification and regression layer of the residual network to obtain an identity classification probability of the target person. The method improves the accuracy of the person search.

20 Claims, 4 Drawing Sheets

(51) Int. Cl.
    *G06F 18/214*     (2023.01)
    *G06F 18/2415*     (2023.01)
    *G06N 3/045*     (2023.01)
    *G06N 3/08*     (2023.01)
    *G06N 3/084*     (2023.01)
    *G06V 20/40*     (2022.01)

(52) U.S. Cl.
    CPC ......... *G06F 18/2415* (2023.01); *G06N 3/045* (2023.01); *G06N 3/08* (2013.01); *G06V 20/40* (2022.01); *G06V 40/103* (2022.01)

BI-DIRECTIONAL INTERACTION NETWORK (BINET)-BASED PERSON SEARCH METHOD, SYSTEM, AND APPARATUS

CROSS REFERENCE TO THE RELATED APPLICATIONS

This application is the continuation application of International Application No. PCT/CN2020/099943, filed on Jul. 2, 2020, which is based upon and claims priority to Chinese Patent Application No. 202010557984.9, filed on Jun. 18, 2020, the entire contents of which are incorporated herein by reference.

TECHNICAL FIELD

The present disclosure relates to the fields of computer vision and pattern recognition, and specifically, to a bi-directional interaction network (BINet)-based person search method, system, and apparatus.

BACKGROUND

Person search is used to locate a person whose identity is the same as a target person in a scene image. Compared with person re-identification, the person search includes person detection, and is more practical in real life. Person search has been widely applied in the fields of security monitoring, intelligent video analysis, and search and rescue (SAR). Generally, in a single-stage person search method, a multi-task model is used to complete person detection and identity identification at the same time.

The scene image is input into a multi-task network, and features of a person need to be extracted from features of the scene image. Because a deep convolutional network has a large receptive field after passing a plurality of layers, these features of the person usually contain a lot of scene information outside a boundary of the person. Although the scene information is conducive to person detection, the additional scene information will lead to insufficient discrimination of identity features of the person since the identity identification task needs detailed information. These difficulties have not been well resolved in the prior art. Therefore, the present disclosure provides a BINet-based person search method.

SUMMARY

To resolve the above problem in the prior art, namely, to resolve the problem of low accuracy of person search due to an influence of scene information outside a boundary on features of a person, a first aspect of the present disclosure provides a BINet-based person search method. The method includes:

step S100: obtaining, as an input image, a $t^{th}$ frame of image in an input video; and step S200: normalizing the input image, and obtaining a search result of a to-be-searched target person by using a pre-trained person search model, where the person search model is constructed based on a residual network, and a new classification layer is added to a classification and regression layer of the residual network to obtain an identity classification probability of the target person.

In some preferred implementations, a method for obtaining the person search model through training includes:

obtaining a data set of training sample images, where the training sample images are scene images; and normalizing each scene image;

extracting a feature of each normalized scene image based on a conv1 layer, a conv2 layer, a conv3 layer, and a conv4 layer of the residual network, and obtaining a candidate region based on a region proposal network (RPN) layer of the residual network;

extracting a feature of each candidate region based on a region of interest (ROI)-pooling layer of the residual network, performing pooling on the feature based on a conv5 layer and a global pooling layer of the residual network, and using a pooled feature as a first feature;

cutting out an image of each candidate region from the normalized scene image, and normalizing the image; and obtaining, after normalization, a pooled feature of each region by using an instance-aware network and using the pooled feature of each region as a second feature, where the instance-aware network is constructed based on the person search model by deleting the RPN layer from the person search model, retaining the newly added classification layer in the classification and regression layer, and deleting the original classification and regression layer;

obtaining, as a first probability, a classification probability of each target person based on each first feature by using the newly added classification layer in the person search model, and obtaining, as a second probability, a classification probability of each target person based on each second feature by using a classification layer of the instance-aware network;

calculating, as a first loss value, a loss value between the first feature and the second feature by using a preset first loss function, and calculating, as a second loss value, a loss value between the first probability and the second probability by using a preset second loss function; and calculating a global loss value based on the first loss value and the second loss value by using a preset third loss function, and updating network parameters of the person search model based on the global loss value.

In some preferred implementations, the step of calculating, as the first loss value, the loss value between the first feature and the second feature by using the preset first loss function is implemented according to the following formula:

$$L_{fi} = \frac{1}{N(\Omega)} \sum_{b \in \Omega} [1 - \cos(f_r(b), f_s(b))]$$

where $L_{fi}$ represents the first loss value, $f_r(b)$ represents the second feature, $f_s(b)$ represents the first feature, $\Omega$ represents a set of candidate regions obtained from various training sample images, and $N(\Omega)$ represents a quantity of the candidate regions.

In some preferred implementations, the step of calculating, as a second loss value, the loss value between the first probability and the second probability by using the preset second loss function is implemented according to the following formula:

$$L_{pi} = D_{KL}(p_r(b)\|p_s(b)) + D_{KL}(p_s(b)\|p_r(b))$$

where $L_{pi}$ represents the second loss value, $p_s(b)$ represents the first probability, $p_r(b)$ represents the second probability, and $D_{KL}(\cdot)$ represents Kullback-Leibler divergence for measuring a difference between two probability distributions.

In some preferred implementations, the step of calculating the global loss value by using the preset third loss function is implemented according to the following formula:

$$L_{all}=L_{det}+L_{fi}+L_{pi}+0.5\cdot(L_{oim}^{s}+L_{oim}^{r})$$

where $L_{all}$ represents the global loss value, $L_{fi}$ represents the first loss value, $L_{pi}$ represents the second loss value, $L_{det}$ represents a sum of a classification loss of an RPN in the person search model, a regression loss of the RPN in the person search model, a classification loss of a classification branch of the person search model, and a regression loss of a regression branch of the person search model, and $L_{oim}^{s}$ and $L_{oim}^{r}$ respectively represent losses between identity type probability distributions and real identities, obtained by the person search model and the instance-aware network, respectively.

In some preferred implementations, the step of obtaining the search result of the to-be-searched target person by using the pre-trained person search model in step S200 includes:

obtaining a detection region of each target person based on the normalized image by using the person search model; and calculating a similarity between each detection region and a preset image of the target person, and using a detection region with a largest similarity as the search result of the to-be-searched target person in the current frame.

In some preferred implementations, the person search model is obtained through training by using a back propagation algorithm and a stochastic gradient descent method.

A second aspect of the present disclosure provides a BINet-based person search system, where the system includes an obtaining module and an output module;

the obtaining module is configured to obtain, as an input image, a $t^{th}$ frame of image in an input video; and the output module is configured to normalize the input image, and obtain a search result of a to-be-searched target person by using a pre-trained person search model, where the person search model is constructed based on a residual network, and a new classification layer is added to a classification and regression layer of the residual network to obtain an identity classification probability of the target person.

A third aspect of the present disclosure provides a storage apparatus, where a plurality of programs are stored in the storage apparatus, and the programs are loaded and executed by a processor to implement the BINet-based person search method described above.

A fourth aspect of the present disclosure provides a processing apparatus, including a processor and a storage apparatus, where the processor is configured to execute each program; a plurality of programs are stored in the storage apparatus; and the programs are loaded and executed by the processor to implement the BINet-based person search method described above.

The present disclosure has the following advantages.

The present disclosure improves the accuracy of the person search. The present disclosure uses, as a main branch, the person search model constructed based on the residual network, and introduces an instance-aware branch based on the main branch. The instance-aware branch is constructed based on a network of the main branch, but does not include the RPN, and the instance-aware branch uses an image of a candidate region of the target person as an input, where the image is obtained from the training sample image input by the main branch.

In a training process, bi-directional information interaction happens between the two branches. In a test stage, the main branch is solely used to fulfil a person search task. The instance-aware branch introduced in the method in the present disclosure can provide the guidance for obtaining the person search model through training, such that the model can focus on the person in the training process, and use information in the boundary of the person to distinguish between different identities rather than information outside the boundary, so as to improve learned discrimination of features in the test stage. In this way, the influence of irrelevant scene information on features of a person in an existing single-stage person search method can be eliminated, which improves the accuracy of the person search.

BRIEF DESCRIPTION OF THE DRAWINGS

Other features, objectives, and advantages of the present disclosure will become more apparent upon reading the detailed description of the non-restrictive embodiments with reference to the following figures.

DETAILED DESCRIPTION OF THE EMBODIMENTS

In order to make the objectives, technical solutions, and advantages of the present disclosure clearer, the technical solutions in the embodiments of the present disclosure are described clearly and completely below in combination with the drawings. Apparently, the described embodiments are some rather than all of the embodiments of the present disclosure. All other embodiments obtained by a person of ordinary skill in the art based on the embodiments of the present disclosure without creative efforts shall fall within the claimed scope of the present disclosure.

The present disclosure will be further described in detail hereinafter by combining the drawings and embodiments. It may be understood that the specific embodiments described herein are merely intended to explain the present disclosure, rather than to limit the present disclosure. It should also be noted that, for convenience of description, only the parts related to the present disclosure are shown in the drawings.

It should be noted that the embodiments of the present disclosure and features in the embodiments may be combined with each other if no conflict occurs.

Figure 1:
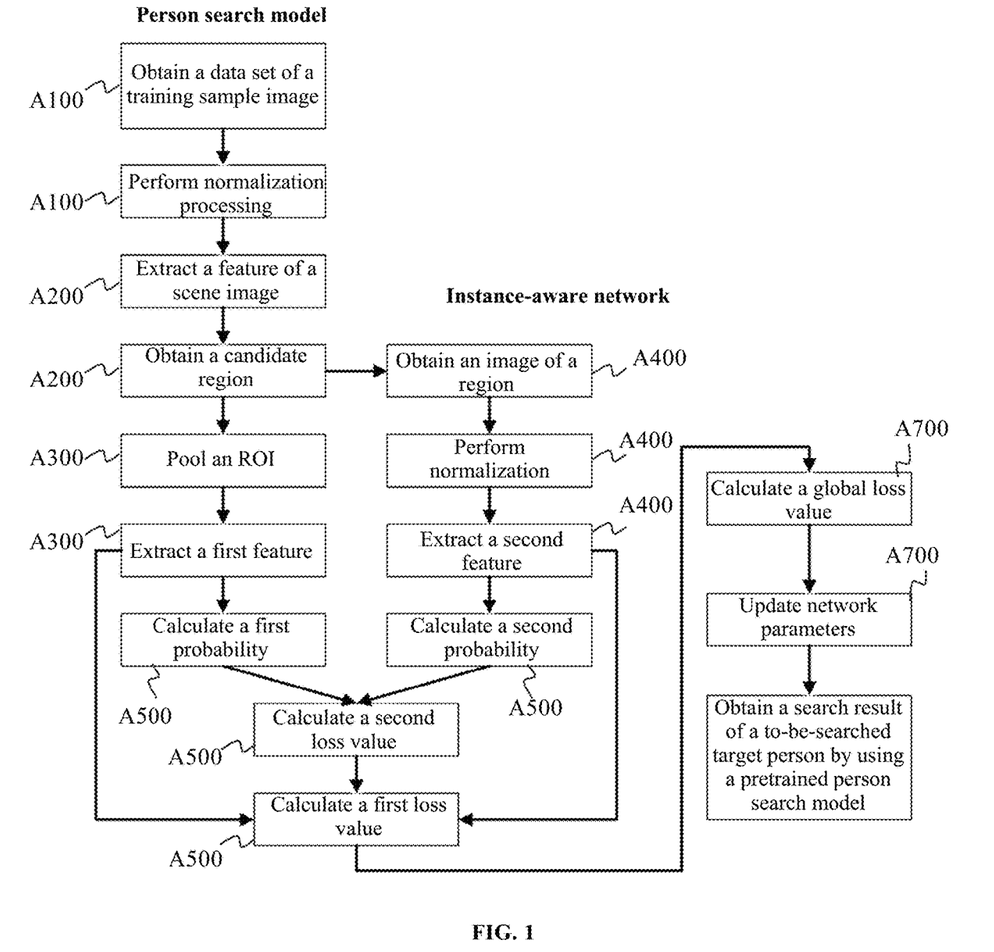
FIG. 1 is a schematic flowchart of a BINet-based person search method according to an embodiment of the present disclosure.

As shown in FIG. 1, a BINet-based person search method in the present disclosure includes the following steps:

Step S100: Obtaining, as an input image, the $t^{th}$ frame of image in an input video.

Step S200: Normalizing the input image, and obtaining a search result of a to-be-searched target person by using a pre-trained person search model.

The person search model is constructed based on a residual network, and a new classification layer is added to a classification and regression layer of the residual network to obtain an identity classification probability of the target person.

To more clearly explain the BINet-based person search method in the present disclosure, steps in an embodiment of the method in the present disclosure are described in detail below with reference to the drawings.

In the following preferred embodiment, a process of obtaining a person search model through training is first described in detail, and then how to obtain a search result of a to-be-searched target person by using the BINet-based person search method is described in detail.

1. Process of Obtaining the Person Search Model Through Training

Step A100: Obtaining a data set of training sample images, where the training sample images are scene images; and normalizing each scene image.

In this embodiment, a training sample image set is obtained. Usually, an image in person search is a scene image. In the present disclosure, to further improve the accuracy of the person search, a scene image with a length of a short edge not less than 600 pixels is preferably selected as the training sample image. Each image in the obtained training sample image set is normalized.

Step A200: Extracting a feature of each normalized scene image based on a conv1 layer, a conv2 layer, a conv3 layer, and a conv4 layer of a residual network, and obtaining a candidate region based on an RPN layer of the residual network.

Figure 3:
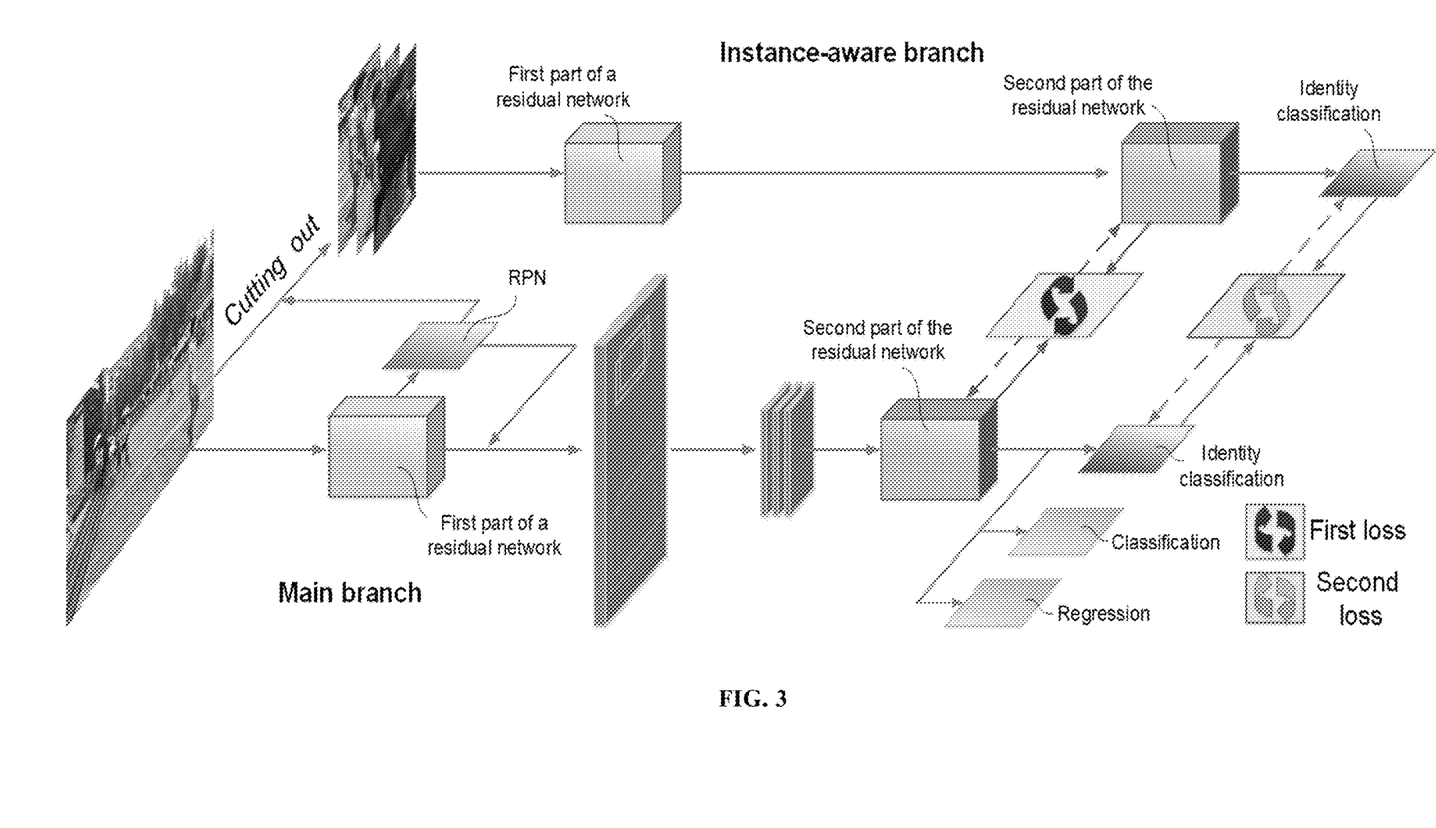
FIG. 3 is a schematic diagram of a process of obtaining a person search model through training according to an embodiment of the present disclosure.

In this embodiment, the normalized training sample image is input into a single-stage person search model. The person search model is constructed based on the residual network, including a convolutional (conv) layer, an RPN layer, an ROI-pooling layer, a global pooling layer, and a classification and regression layer. A new classification layer (namely, an OIM classifier) is added to the classification and regression layer of the residual network, and used to obtain an identity classification probability of a target person. The original classification and regression layer is a binary classifier (Softmax classifier), and is used to distinguish between a person and a background. The feature of each normalized training sample image is extracted based on the conv1 layer, the conv2 layer, the conv3 layer, and the conv4 layer of the person search model, and a candidate region of the target person in each training sample image is obtained based on the RPN layer. As shown in FIG. 3, a main branch in FIG. 3 is the person search model, including a first part of the residual network, namely, the conv1 layer, the conv2 layer, the conv3 layer, and the conv4 layer, and a second part of the residual network, namely, the ROI-pooling layer and a conv5 layer. Other parts will be described below.

Step A300: Extracting a feature of each candidate region based on the ROI-pooling layer of the residual network, performing pooling on the feature based on the conv5 layer and the global pooling layer of the residual network, and using a pooled feature as a first feature.

In this embodiment, the feature of each candidate region is extracted based on the ROI-pooling layer of the residual network of the person search model, the feature is pooled based on the conv5 layer and the global pooling layer of the residual network, and the pooled feature is used as the first feature.

Step A400: Cutting out an image of each candidate region from the normalized scene image, and normalize the obtained image; and obtain, after normalization, a pooled feature of each region by using an instance-aware network and using the pooled feature of each region as a second feature, where the instance-aware network is constructed based on the person search model by deleting the RPN layer from the person search model, retaining the newly added classification layer in the classification and regression layer, and deleting the original classification and regression layer.

In this embodiment, an instance-aware branch, namely, the instance-aware network, is introduced based on an existing single-stage person search framework (with the person search model as the main branch). The instance-aware branch uses an image of a candidate region of the target person as an input, wherein the image is obtained from the training sample image input by the main branch (in other words, a sub-image is cut out from the training sample image based on an ROI). The instance-aware branch is constructed based on the residual network of the person search model, and shares parameters with the main branch. However, the instance-aware branch does not include the RPN layer, retains the newly added classification layer (OIM classifier) in the person search model, and deletes the original classification and regression layer, as shown in FIG. 3.

A region selected based on an RPN is cut out from the normalized scene image, to obtain and normalize the image of each region. The image of each region is input into the first part (the conv1 layer, the conv2 layer, the conv3 layer, and the conv4 layer) and the second part (the conv5 layer and the global pooling layer) of the residual network of the instance perception network, to obtain the second feature $f_r(b)$ of each region.

Step A500: Obtaining, as a first probability, a classification probability of each target person based on each first feature and the newly added classification layer in the person search model, and obtaining, as a second probability, a classification probability of each target person based on each second feature and the classification layer of the instance-aware network.

In this embodiment, the probability distributions of the identity types, namely, identity classification probabilities, of each target person in the main branch (the person search model) and the instance-aware branch (the instance-aware network) are obtained based on each first feature, each second feature, and classification layers (OIM classifiers) of the corresponding network models. A distribution probability $p_s(b)$ obtained by using the person search model is used as the first probability, and a distribution probability $p_r(b)$ obtained by using the instance-aware network is used as the second probability.

Step A500: Calculating, as a first loss value, a loss value between the first feature and the second feature by using a preset first loss function, and calculating, as a second loss value, a loss value between the first probability and the second probability by using a preset second loss function.

In this embodiment, the loss value between the features, obtained in the main branch and the instance-aware branch, of each target person is calculated as the first loss value according to the following formula (1):

$$L_{fi} = \frac{1}{N(\Omega)} \sum_{b \in \Omega} [1 - \cos(f_r(b), f_s(b))] \qquad (1)$$

In the foregoing formula, $L_{fi}$ represents the first loss value, $f_r(b)$ represents the second feature, $f_s(b)$ represents the first feature, $\Omega$ represents a set of candidate regions obtained from various training sample images, and $N(\Omega)$ represents a quantity of the candidate regions.

The loss value between the probability distributions, obtained in the main branch and the instance-aware branch, of each target person is calculated as the second loss value according to the following formula (2):

$$L_{pi}=D_{KL}(p_r(b)\|p_s(b))+D_{KL}(p_s(b)\|p_r(b)) \qquad (2)$$

In the foregoing formula, $L_{pi}$ represents the second loss value, $p_s(b)$ represents the first probability, $p_r(b)$ represents the second probability, and $D_{KL}$ (·) represents Kullback-Leibler divergence for measuring a difference between two probability distributions.

Step A700: Calculating a global loss value based on the first loss value and the second loss value by using a preset third loss function, and updating network parameters of the person search model based on the global loss value.

In this embodiment, the global loss value is calculated based on the obtained first and second loss values by using the global loss function and according to the following formula (3):

$$L_{all}=L_{det}+L_{fi}+L_{pi}+0.5\cdot(L_{oim}^s+L_{oim}^r) \qquad (3)$$

In the foregoing formula, $L_{all}$ represents the global loss value, $L_{det}$ represents a sum of a classification loss of the RPN in the person search model, a regression loss of the RPN in the person search model, a classification loss of a classification branch of the person search model, and a regression loss of a regression branch of the person search model (where the classification branch and the regression branch are referred to as the classification and regression layer), and $L_{oim}^s$ and $L_{oim}^r$ respectively represent losses between identity type probability distributions and real identities, obtained by the person search model and the instance-aware network, respectively.

The network parameters of the person search model are updated based on the global loss value. Because the parameters are shared between the person search model and the instance-ware network, the network parameters of the instance-aware network are also updated.

In addition, in a training process, the global loss is decreased by using a back propagation algorithm and a stochastic gradient descent method, so as to train the model. The final person search model is obtained through a plurality of times of iterative training.

2. BINet-Based Person Search Method

Step S100: Obtaining, as an input image, the $t^{th}$ frame of image in an input video.

In this embodiment, an image frame of a to-be-search target person is obtained from the input video as the input image.

Step S200: Normalizing the input image, and obtaining a search result of the to-be-searched target person by using a pre-trained person search model.

In this embodiment, the input image is normalized. A detection region of each target person is obtained based on the normalized image by using the person search model.

A similarity between each detection region and a preset image of the target person is calculated, and a detection region with a largest similarity is used as the search result of the to-be-searched target person in the current frame.

Figure 2:
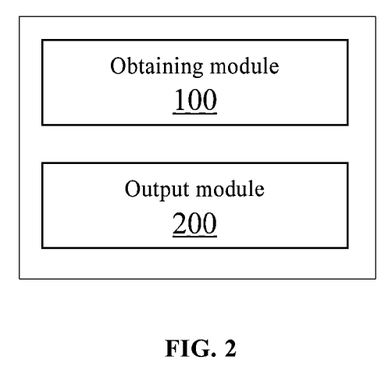
FIG. 2 is a schematic block diagram of a BINet-based person search system according to an embodiment of the present disclosure.

A second embodiment of the present disclosure provides a BINet-based person search system. As shown in FIG. 2, the system includes an obtaining module 100 and an output module 200.

The obtaining module 100 is configured to obtain, as an input image, the $t^{th}$ frame of image in an input video.

The output module 200 is configured to normalize the input image, and obtain a search result of a to-be-searched target person by using a pre-trained person search model.

The person search model is constructed based on a residual network, and a new classification layer is added to a classification and regression layer of the residual network to obtain an identity classification probability of the target person.

Those skilled in the art can clearly understand that, for convenience and brevity of description, the specific working processes and related descriptions of the above-described system correspond to the foregoing method embodiment, and are not described herein again.

It should be noted that the BINet-based person search system provided in the above embodiment is illustrated only based on the division of the above functional modules. In practical application, the foregoing functions may be implemented by different functional modules according to needs. That is, the modules or steps in the embodiments of the present disclosure can be split or combined again, for example, the modules of the above embodiments can be combined into one module or further divided into a plurality of sub-modules to implement all or part of the functions described above. In the embodiments of the present disclosure, names of the modules and steps are only intended to distinguish between the modules or steps, and are not regarded as improper limitations to the present disclosure.

A third embodiment of the present disclosure provides a storage apparatus. A plurality of programs are stored in the storage apparatus, and the programs are loaded and executed by a processor to implement the BINet-based person search method described above.

A fourth embodiment of the present disclosure provides a processing apparatus, including a processor and a storage apparatus. The processor is configured to execute each program; a plurality of programs are stored in the storage apparatus; and the programs are loaded and executed by the processor to implement the BINet-based person search method described above.

Those skilled in the art can clearly understand that, for convenience and brevity of description, the specific working processes and related descriptions of the above-described storage apparatus and processing apparatus correspond to the foregoing method embodiment, and are not described herein again.

Figure 4:
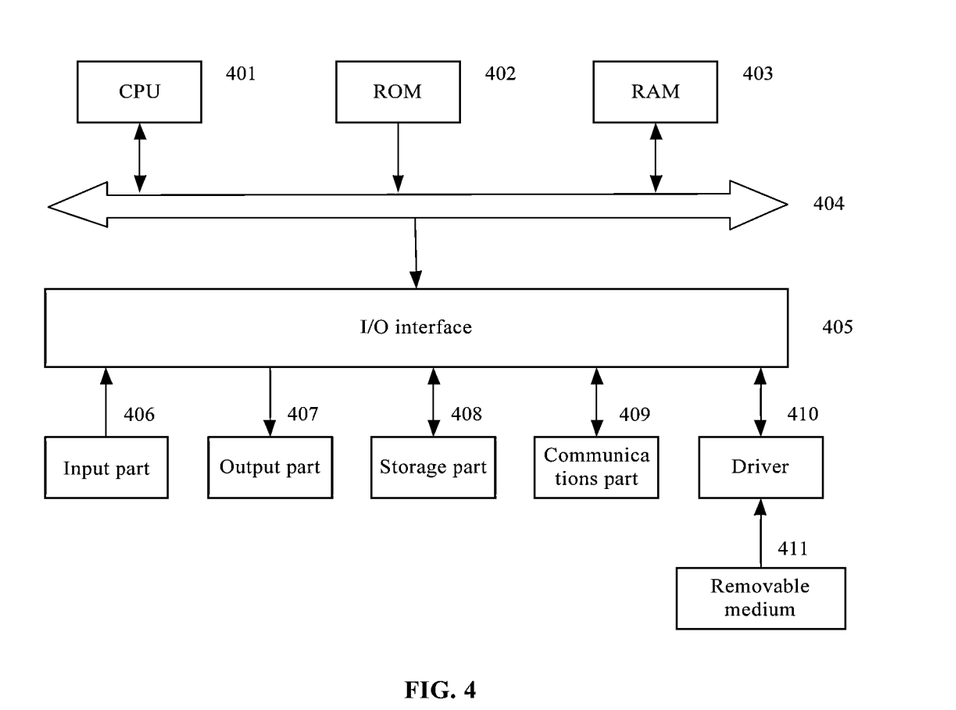
FIG. 4 is a schematic block diagram of a computer system of an electronic device configured for implementing the embodiments of the present disclosure.

FIG. 4 is a schematic block diagram of a computer system of a server suitable for implementing the method, system, and apparatus embodiments of the present disclosure. The server shown in FIG. 4 is merely illustrative, and should not cause any limitation to the functions and application range of the embodiments of the present disclosure.

As shown in FIG. 4, the computer system includes the central processing unit (CPU) 401. The CPU 401 can perform various proper actions and processing according to a program stored in the read-only memory (ROM) 402 or a program loaded to the random access memory (RAM) 403 from the storage part 408. Various programs and data required for operations of the system are stored in the RAM 403. The CPU 401, the ROM 402, and the RAM 403 are connected to each other by using the bus 404. The input/output (I/O) interface 405 is also connected to the bus 404.

The following components are connected to the I/O interface 405: the input part 406 including a keyboard, a mouse, and the like; the output part 407 including a cathode-ray tube (CRT), a liquid crystal display (LCD), a loudspeaker, and the like; the storage part 408 including a hard disk; and the communications part 409 including a network interface card such as a local area network (LAN) card or a modem. The communications part 409 executes communication processing via a network such as the Internet. The driver 410 is also connected to the I/O interface 405 as required. The removable medium 411, such as a magnetic disk, an optical disc, a magneto-optical disc, a semiconductor memory, is installed on the driver 410 as required, so that a computer program from the removable medium 411 can be installed in the storage part 408 as required.

Particularly, according to the embodiments of the present disclosure, the process described above with reference to the flowchart may be implemented as a computer software program. For example, an embodiment of the present disclosure provides a computer program product including a computer program carried by a computer-readable medium. The computer program includes program code for executing the method shown in the flowchart. In this embodiment, the computer program may be downloaded from a network by using the communications part 409 and installed, and/or be installed from the removable medium 411. When the computer program is executed by the CPU 401, the functions defined in the method of the present disclosure are performed. It should be noted that, the computer-readable medium in the present disclosure may be a computer-readable signal medium, a computer-readable storage medium, or a combination thereof. For example, the computer-readable storage medium may be, but is not limited to, an electric, magnetic, optical, electromagnetic, infrared, or semiconductor system, apparatus or device, or any combination thereof. More specific examples of the computer-readable storage medium may include, but are not limited to: an electric connector with one or more wires, a portable computer magnetic disk, a hard disk, a RAM, a ROM, an erasable programmable read-only memory (EPROM) or flash memory, an optical fiber, a compact disk read-only memory (CD-ROM), an optical storage device, a magnetic storage device, or any proper combination thereof. In the present disclosure, the computer-readable storage medium may be any tangible medium containing or storing a program, and the program may be used by or combined with an instruction execution system, apparatus or device. In the present disclosure, the computer-readable signal medium may include a data signal propagated in a baseband or propagated as a part of a carrier, and the computer-readable signal medium carries computer-readable program code. Such a propagated data signal may be in a plurality of forms, including but not limited to an electromagnetic signal, an optical signal, or any proper combination thereof. The computer-readable signal medium may be any computer-readable medium except the computer-readable storage medium. The computer-readable medium may send, propagate or transmit a program used by or combined with an instruction execution system, apparatus or device. The program code contained in the computer-readable medium may be transmitted by using any suitable medium, including but is not limited to radio, an electric wire, an optical fiber, a radio frequency (RF) device, or any proper combination thereof.

Computer program code for executing the operations in the present disclosure may be compiled by using one or more programming languages or a combination thereof. The programming languages include object-oriented programming languages such as Java, Smalltalk, and C++, and conventional procedural programming languages such as C or similar programming languages. The program code can be executed fully on a user computer, executed partially on a user computer, executed as an independent software package, executed partially on a user computer and partially on a remote computer, or executed fully on a remote computer or a server. When a remote computer is involved, the remote computer may be connected to the user computer via any type of network including a LAN or a wide area network (WAN), or may be connected to an external computer (for example, connected via the Internet by using an Internet service provider).

The flowcharts and block diagrams in the drawings illustrate system architectures, functions and operations that may be implemented by the system, method and computer program product in the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that, in some alternative implementations, functions marked in the blocks may also take place in an order different from the order marked in the drawings. For example, two connected blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a specific hardware-based system for executing specified functions or operations, or may be implemented by a combination of dedicated hardware and computer instructions.

The terms "first", "second", and so on are intended to distinguish between similar objects but do not necessarily indicate a specific order or sequence.

In addition, terms "include", "comprise", or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions of the present disclosure have been described with the preferred implementations shown in the drawings. Those skilled in the art should easily understand that the claimed scope of the present disclosure is apparently not limited to these specific implementations. Those skilled in the art can make equivalent changes or substitutions to the relevant technical features without departing from the principles of the present disclosure, and the technical solutions after these changes or substitutions should fall within the claimed scope of the present disclosure.

What is claimed is:

1. A bi-directional interaction network (BINet)-based person search method, comprising
    obtaining a $t^{th}$ frame of image in an input video as an input image; and
    normalizing the input image to obtaining a normalized image, and obtaining a search result of a to-be-searched target person by using a pre-trained person search model, wherein
    the pre-trained person search model is constructed based on a residual network, and a new classification layer is added to a classification and regression layer of the residual network to obtain an identity classification probability of the to-be-searched target person.

2. The BINet-based person search method according to claim 1, wherein a method for obtaining the pre-trained person search model through training comprises:

obtaining a data set of training sample images, wherein the data set of training sample images comprising scene images; and normalizing each scene image to obtain normalized scene images;

extracting a feature of each normalized scene image based on a conv1 layer, a conv2 layer, a conv3 layer, and a conv4 layer of the residual network, and obtaining candidate regions based on a region proposal network (RPN) layer of the residual network;

extracting a feature of each candidate region based on a region of interest (ROI)-pooling layer of the residual network, performing pooling on the feature of each candidate region based on a conv5 layer and a global pooling layer of the residual network to obtain a pooled feature, and using the pooled feature as a first feature;

cutting out an image of each candidate region from the normalized scene image, and normalizing the image; and obtaining, after normalization, a pooled feature of each candidate region by using an instance-aware network and using the pooled feature of each candidate region as a second feature, wherein the instance-aware network is constructed based on a person search model by deleting the RPN layer from the person search model, retaining the new classification layer in the classification and regression layer, and deleting an original classification and regression layer;

obtaining a first classification probability of each target person based on each first feature by the new classification layer in the person search model, and using the first classification probability as a first probability; and obtaining a second classification probability of each target person based on each second feature by a classification layer of the instance-aware network, and using the second classification probability as a second probability;

calculating a first loss value between the first feature and the second feature by a preset first loss function; and calculating a second loss value between the first probability and the second probability by a preset second loss function; and calculating a global loss value based on the first loss value and the second loss value by using a preset third loss function, and updating network parameters of the person search model based on the global loss value.

3. The BINet-based person search method according to claim 2, wherein the step of calculating the first loss value between the first feature and the second feature by the preset first loss function is implemented according to the following formula:

$$L_{fi} = \frac{1}{N(\Omega)} \sum_{b \in \Omega} [1 - \cos(f_r(b), f_s(b))],$$

wherein $L_{fi}$ represents the first loss value, $f_r(b)$ represents the second feature, $f_s(b)$ represents the first feature, $\Omega$ represents a set of candidate regions obtained from various training sample images, and $N(\Omega)$ represents a quantity of the set of candidate regions.

4. The BINet-based person search method according to claim 3, wherein the step of calculating the second loss value between the first probability and the second probability by using the preset second loss function is implemented according to the following formula:

$$L_{pi} = D_{KL}(p_r(b)\|p_s(b)) + D_{KL}(p_s(b)\|p_r(b)),$$

wherein $L_{pi}$ represents the second loss value, $p_s(b)$ represents the first probability, $p_r(b)$ represents the second probability, and $D_{KL}(\cdot)$ represents Kullback-Leibler divergence for measuring a difference between two probability distributions.

5. The BINet-based person search method according to claim 4, wherein the step of calculating the global loss value by using the preset third loss function is implemented according to the following formula:

$$L_{all} = L_{det} + L_{fi} + L_{pi} + 0.5 \cdot (L_{oim}^s + L_{oim}^r),$$

wherein $L_{all}$ represents the global loss value, $L_{fi}$ represents the first loss value, $L_{pi}$ represents the second loss value, $L_{det}$ represents a sum of a classification loss of an RPN in the person search model, a regression loss of the RPN in the person search model, a classification loss of a classification branch of the person search model, and a regression loss of a regression branch of the person search model, $L_{oim}^s$ represents a first loss between identity type probability distributions and real identities, obtained by the person search model, and $L_{oim}^r$ represents a second loss between the identity type probability distributions and the real identities, obtained by the instance-aware network.

6. The BINet-based person search method according to claim 1, wherein the step of obtaining the search result of the to-be-searched target person by using the pre-trained person search model comprises:

obtaining a detection region of each target person based on the normalized image by using the pre-trained person search model; and calculating a similarity between each detection region and a preset image of the to-be-searched target person, and using a detection region with a largest similarity as the search result of the to-be-searched target person in a current frame.

7. The BINet-based person search method according to claim 2, wherein in a training process the pre-trained person search model is trained by using a back propagation algorithm and a stochastic gradient descent method.

8. A BINet-based person search system, comprising an obtaining module and an output module;

the obtaining module is configured to obtain, as an input image, a $t^{th}$ frame of image in an input video; and the output module is configured to normalize the input image, and obtain a search result of a to-be-searched target person by using a pre-trained person search model, wherein the pre-trained person search model is constructed based on a residual network, and a new classification layer is added to a classification and regression layer of the residual network to obtain an identity classification probability of the to-be-searched target person.

9. A storage apparatus, wherein a plurality of programs are stored in the storage apparatus, and the plurality of programs are loaded and executed by a processor to implement a BINet-based person search method the method comprising:

obtaining a $t^{th}$ frame of image in an input video as an input image; and normalizing the input image to obtaining a normalized image, and obtaining a search result of a to-be-searched target person by using a pre-trained person search model, wherein the pre-trained person search model is constructed based on a residual network, and a new classification layer is added to a classification and regression layer of the residual network to obtain an identity classification probability of the to-be-searched target person.

10. The BINet-based person search method according to claim 1, wherein the method is implemented using a processing apparatus, the processing apparatus comprising a processor and a storage apparatus, wherein the processor is configured to execute each program; a plurality of programs are stored in the storage apparatus; and the plurality of programs are loaded and executed by the processor to implement the BINet-based person search method.

11. The storage apparatus according to claim 9, wherein the method further includes a method for obtaining the pre-trained pedestrian search model through training comprising:
obtaining a data set of training sample images, wherein the data set of training sample images comprises scene images; and normalizing each scene image to obtain normalized scene images;
extracting a feature of each normalized scene image based on a conv1 layer, a conv2 layer, a conv3 layer, and a conv4 layer of the residual network, and obtaining candidate regions based on a region proposal network (RPN) layer of the residual network;
extracting a feature of each candidate region based on a region of interest (ROI)-pooling layer of the residual network, performing pooling on the feature of each candidate region based on a conv5 layer and a global pooling layer of the residual network to obtain a pooled feature, and using the pooled feature as a first feature;
cutting out an image of each candidate region from the normalized scene image, and normalizing the image; and obtaining, after normalization, a pooled feature of each candidate region by using an instance-aware network and using the pooled feature of each candidate region as a second feature, wherein the instance-aware network is constructed based on a pedestrian search model by deleting the RPN layer from the pedestrian search model, retaining the new classification layer in the classification and regression layer, and deleting an original classification and regression layer;
obtaining a first classification probability of each target pedestrian based on each first feature by the new classification layer in the pedestrian search model, and using the first classification probability as a first probability; and obtaining a second classification probability of each target pedestrian based on each second feature by a classification layer of the instance-aware network, and using the second classification probability as a second probability;
calculating a first loss value between the first feature and the second feature by a preset first loss function; and calculating a second loss value between the first probability and the second probability by a preset second loss function; and
calculating a global loss value based on the first loss value and the second loss value by using a preset third loss function, and updating network parameters of the pedestrian search model based on the global loss value.

12. The storage apparatus according to claim 11, wherein the step of calculating the first loss value between the first feature and the second feature by the preset first loss function is implemented according to the following formula:

$$L_{fi} = \frac{1}{N(\Omega)} \sum_{b \in \Omega} [1 - \cos(f_r(b), f_s(b))],$$

wherein $L_{fi}$ represents the first loss value, $f_r(b)$ represents the second feature, $f_s(b)$ represents the first feature, $\Omega$ represents a set of candidate regions obtained from various training sample images, and $N(\Omega)$ represents a quantity of the set of candidate regions.

13. The storage apparatus according to claim 12, wherein the step of calculating the second loss value between the first probability and the second probability by using the preset second loss function is implemented according to the following formula:

$$L_{pi}=D_{KL}(p_r(b)\|p_s(b))+D_{KL}(p_s(b)\|p_r(b)),$$

wherein $L_{pi}$ represents the second loss value, $p_s(b)$ represents the first probability, $p_r(b)$ represents the second probability, and $D_{KL}$ (·) represents Kullback-Leibler divergence for measuring a difference between two probability distributions.

14. The storage apparatus according to claim 13, wherein the step of calculating the global loss value by using the preset third loss function is implemented according to the following formula:

$$L_{all}=L_{det}+L_{fi}+L_{pi}+0.5\cdot(L_{oim}^s+L_{oim}^r),$$

wherein $L_{all}$ represents the global loss value, $L_{fi}$ represents the first loss value, $L_{pi}$ represents the second loss value, $L_{det}$ represents a sum of a classification loss of an RPN in the pedestrian search model, a regression loss of the RPN in the pedestrian search model, a classification loss of a classification branch of the pedestrian search model, and a regression loss of a regression branch of the pedestrian search model, $L_{oim}^s$ represents a first loss between identity type probability distributions and real identities, obtained by the pedestrian search model, and $L_{oim}^r$ represents a second loss between the identity type probability distributions and the real identities, obtained by the instance-aware network.

15. The storage apparatus according to claim 9, wherein the step of obtaining the search result of the to-be-searched target pedestrian by using the pre-trained pedestrian search model comprises:
obtaining a detection region of each target pedestrian based on the normalized image by using the pre-trained pedestrian search model; and
calculating a similarity between each detection region and a preset image of the to-be-searched target pedestrian, and using a detection region with a largest similarity as the search result of the to-be-searched target pedestrian in a current frame.

16. The storage apparatus according to claim 11, wherein in a training process, the pre-trained pedestrian search model is trained by using a back propagation algorithm and a stochastic gradient descent method.

17. The BINet-based person search method according to claim 10, wherein the method further comprises a method for obtaining the pre-trained pedestrian search model through training comprises:
obtaining a data set of training sample images, wherein the data set of training sample images comprises scene images; and normalizing each scene image to obtain normalized scene images;
extracting a feature of each normalized scene image based on a conv1 layer, a conv2 layer, a conv3 layer, and a conv4 layer of the residual network, and obtaining candidate regions based on a region proposal network (RPN) layer of the residual network;
extracting a feature of each candidate region based on a region of interest (ROI)-pooling layer of the residual network, performing pooling on the feature of each candidate region based on a conv5 layer and a global pooling layer of the residual network to obtain a pooled feature, and using the pooled feature as a first feature;

cutting out an image of each candidate region from the normalized scene image, and normalizing the image; and obtaining, after normalization, a pooled feature of each candidate region by using an instance-aware network and using the pooled feature of each candidate region as a second feature, wherein the instance-aware network is constructed based on a pedestrian search model by deleting the RPN layer from the pedestrian search model, retaining the new classification layer in the classification and regression layer, and deleting an original classification and regression layer;

obtaining a first classification probability of each target pedestrian based on each first feature by the new classification layer in the pedestrian search model, and using the first classification probability as a first probability; and obtaining a second classification probability of each target pedestrian based on each second feature by a classification layer of the instance-aware network, and using the second classification probability as a second probability;

calculating a first loss value between the first feature and the second feature by a preset first loss function; and calculating a second loss value between the first probability and the second probability by a preset second loss function; and calculating a global loss value based on the first loss value and the second loss value by using a preset third loss function, and updating network parameters of the pedestrian search model based on the global loss value.

18. The BINet-based person search method according to claim 17, wherein the step of calculating the first loss value between the first feature and the second feature by the preset first loss function is implemented according to the following formula:

$$L_{fi} = \frac{1}{N(\Omega)} \sum_{b \in \Omega} [1 - \cos(f_r(b), f_s(b))],$$

wherein $L_{fi}$ represents the first loss value, $f_r(b)$ represents the second feature, $f_s(b)$ represents the first feature, $\Omega$ represents a set of candidate regions obtained from various training sample images, and $N(\Omega)$ represents a quantity of the set of candidate regions.

19. The BINet-based person search method according to claim 18, wherein the step of calculating the second loss value between the first probability and the second probability by using the preset second loss function is implemented according to the following formula:

$$L_{pi} = D_{KL}(p_r(b) \| p_s(b)) + D_{KL}(p_s(b) \| p_r(b)),$$

wherein $L_{pi}$ represents the second loss value, $p_s(b)$ represents the first probability, $p_r(b)$ represents the second probability, and $D_{KL}(\cdot)$ represents Kullback-Leibler divergence for measuring a difference between two probability distributions.

20. The BINet-based person search method according to claim 19, wherein the step of calculating the global loss value by using the preset third loss function is implemented according to the following formula:

$$L_{all} = L_{det} + L_{fi} + L_{pi} + 0.5 \cdot (L_{oim}^s + L_{oim}^r),$$

wherein $L_{all}$ represents the global loss value, $L_{fi}$ represents the first loss value, $L_{pi}$ represents the second loss value, $L_{det}$ represents a sum of a classification loss of an RPN in the pedestrian search model, a regression loss of the RPN in the pedestrian search model, a classification loss of a classification branch of the pedestrian search model, and a regression loss of a regression branch of the pedestrian search model, $L_{oim}^s$ represents a first loss between identity type probability distributions and real identities, obtained by the pedestrian search model, and $L_{oim}^r$ represents a second loss between the identity type probability distributions and the real identities, obtained by the instance-aware network.

\* \* \* \* \*